United States Patent [19]

Lace

[11] 3,943,424
[45] Mar. 9, 1976

[54] BIASING SYSTEM FOR SCR REGULATOR

[75] Inventor: Melvin Arthur Lace, Prospect Heights, Ill.

[73] Assignee: Motorola, Inc., Chicago, Ill.

[22] Filed: Aug. 16, 1974

[21] Appl. No.: 498,014

[52] U.S. Cl. ............... 320/64; 320/68; 320/DIG. 2; 322/28; 322/73; 323/22 SC; 323/38
[51] Int. Cl.² .......................................... H02J 7/24
[58] Field of Search ........... 320/64, 68, 69, DIG. 2; 322/28, 29, 59, 68, 72, 73; 323/8, 22 SC, 34–38, 17

[56] References Cited
UNITED STATES PATENTS

| | | | |
|---|---|---|---|
| 3,230,443 | 1/1966 | Hallidy | 322/28 |
| 3,314,001 | 4/1967 | Brockman | 322/73 |
| 3,522,508 | 8/1970 | Gadd | 322/28 |
| 3,588,663 | 6/1971 | Hirata | 320/64 |

Primary Examiner—Gerald Goldberg
Attorney, Agent, or Firm—James W. Gillman; Donald J. Lisa; Phillip Melamed

[57] ABSTRACT

Apparatus for switching a silicon controlled rectifier (SCR) into an off state and maintaining it there is disclosed. The apparatus uses a diode and an inductor in series with the cathode of the SCR. The voltage developed across the diode is negatively applied across the gate to cathode electrodes to maintain the SCR in an off condition. The diode voltage is applied to the SCR electrodes by a switching transistor. An alternator regulator system which uses the SCR control apparatus is also disclosed.

26 Claims, 2 Drawing Figures

BIASING SYSTEM FOR SCR REGULATOR

BACKGROUND

SCRs are commonly used to control large currents. When an SCR fires, and the SCR maintains a conducting state between its anode and cathode until the through current falls below a minimum holding current level. The gate to cathode voltage determines the anode to cathode voltage at which the SCR will fire. A normal method of operating an SCR device is to apply a positive and negative going AC voltage across the anode to cathode terminals, thus when the positive anode to cathode voltage is large enough, the SCR fires and when the anode to cathode voltage becomes zero, the gate regains control over the device. Prior art circuits either short circuit the gate to cathode terminals or apply a small positive voltage equal to the saturation voltage of a transistor across the gate to cathode terminals to hold the SCR in an off condition. These prior art techniques do not insure that the SCR will stay in a non-conducting state because with any small positive gate to cathode voltage, the SCR will still fire at a large positive anode to cathode voltage, or when the anode voltage rise per unit time is large. Thus prior circuits must prevent large anode to cathode voltages from being applied to the SCR. Even with zero volts applied between the gate and cathode terminals, the SCR may still fire at some positive anode to cathode voltage, and this anode to cathode voltage is extremely dependent upon temperature. Thus prior art circuits do not immunize an SCR firing control circuit against temperature variations.

Alternator regulator systems have used SCR control circuits to energize the field coil of the generator. Both the battery voltage and the output voltage of a generator winding have been used in prior art circuits to energize the field coil winding. In all cases where an SCR was used to control the field coil winding. In all cases where an SCR was used to control the field coil excitation, complex feedback circuits were necessary to insure that the SCR would turn off and stay in an off condition when the battery attained a fully charged condition.

SUMMARY OF THE INVENTION

The object of this invention is to provide a simplified and improved SCR control system which energizes an inductor, such as the field coil in an alternator.

A further object of this invention is to provide an SCR control system that has improved temperature stability characteristics.

An additional object of this invention is to provide an SCR control system that uses a control transistor having a high saturation voltage for biasing the gate to cathode voltage of an SCR.

The present specification discloses an SCR, having an AC voltage applied across the anode to cathode terminals, which energizes a coil by passing SCR cathode through current first through the anode to cathode electrodes of a diode and then through the high to low potential terminals of an inductor, which is a generator field coil in the present embodiment. A control device, an NPN transistor in the preferred embodiment, has its emitter connected to the high potential side of the inductor and its collector connected to the gate of the SCR. A standard fly-wheel diode has its cathode connected to the cathode of the SCR and its anode connected to the low potential side of the inductor. The fly-wheel diode prevents voltage transients from appearing at the high potential side of the inductor when the SCR excitation is terminated. The control device is normally open circuited between its collector and emitter terminals and the gate of the SCR is coupled to a source of potential to bias the SCR, so that the SCR will fire at a low anode to cathode voltage. When a control signal is received at the base of the control transistor, the transistor will saturate and effectively short the collector to the emitter electrode. The voltage across the series diode, which is feeding current to the inductor, will then be negatively applied across the gate to cathode terminals of the SCR. The negative gate to cathode voltage will be substantially maintained when the SCR shuts off because the inductor will generate a voltage to maintain the inductor current, since the current in an inductor cannot change instantaneously. Thus when the SCR is turned off by reducing the SCR current to zero, the SCR is maintained in an off condition because of the reverse bias applied to the gate to cathode SCR terminals.

An alternator regulator system, which uses the disclosed silicon controlled rectifier control system to excite the field coil of a generator, is also described. The source of the potential applied to the anode of the SCR is the voltage developed at one terminal of an output generator winding, and the control signal received by the base of the control transistor is a measure of battery voltage detected by a voltage divider and a zener diode. Three output generator windings connected in a delta configuration are shown charging the battery through diodes which create a full wave rectification circuit.

DESCRIPTIONS OF THE DRAWINGS

For a more complete understanding of the invention reference should be made to the drawings in which.

DETAILED DESCRIPTION OF THE PREFERRED EMBODIMENTS OF THE INVENTION

Figure 1:
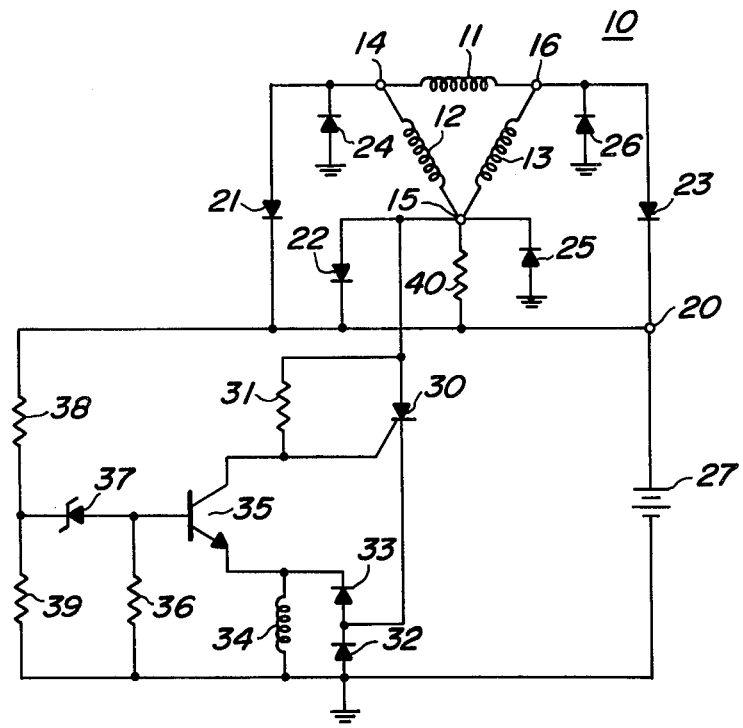
FIG. 1 is a circuit diagram of an alternator regulator system using the inventive SCR control system.

FIG. 1 shows an alternator regulator system 10 which has three generator output windings, 11, 12 and 13, connected in a delta configuration. Each junction of the generator output windings forms a terminal 14, 15 and 16, with output winding 12 being between terminals 14 and 15. Each of terminals 14, 15 and 16 is connected to the anode of a diode 21, 22 and 23 respectively. The cathodes of diodes 21, 22 and 23 are connected to a battery terminal 20. Each of terminals 14, 15 and 16 is also connected to the cathode of a diode 24, 25 and 26 respectively. The anodes of diodes 24, 25 and 26 are connected to ground. Output generator windings 11, 12 and 13 and diodes 21 to 26 represent a full wave rectification circuit for charging a battery 27 having its positive terminal connected to terminal 20 and its negative terminal connected to ground.

An SCR 30 has its anode connected to terminal 15, and also has its anode connected to its gate through a resistor 31. It is understood that the anode of SCR 30 could be connected to any one of terminals 14, 15 or 16. The cathode of SCR 30 is connected to the cathode of a fly-wheel diode 32 and the anode of a series diode 33. The cathode of diode 33 is coupled to the anode of diode 32 through a field excitation coil 34, and the anode of diode 32 is connected to ground. An NPN control transistor 35 has its collector connected to the gate of SCR 30, its emitter connected to the cathode of diode 33, and its base connected to ground through a resistor 36. A zener diode 37 has its anode connected to the base of control transistor 35 and has its cathode connected to terminal 20 through resistor 38 and to ground through resistor 39. Resistors 38 and 39 form a voltage divider network between battery terminal 20 and ground that has an internal tap point connected to the cathode of zener diode 37. Terminal 15 is connected to terminal 20 through a resistor 40.

When field excitation coil 34 is excited, output generator windings 11, 12 and 13 generate voltages which charge battery 27 connected to terminal 20. In this embodiment inductor 34 receives its excitation from the output voltage generated at terminal 15 causing the SCR cathode through current to energize inductor 34 and diode 33. Initially SCR 30 receives its anode voltage through resistor 40; however after field coil 34 is initially excited, the anode voltage of SCR 30 is supplied by the output voltage of the generator windings. Resistors 38 and 39 form a voltage divider between terminal 20 and ground and therefore sense the battery voltage. When the battery voltage present at terminal 20 is above a specified level, zener diode 37 will be activated by a current flowing through resistors 38 and 36. The voltage drop across resistor 36 will then cause control transistor 35 to saturate. If the voltage present at terminal 20 does not exceed a specified level, zener diode 37 will not be energized, the voltage across resistor 36 will be approximately zero, and transistor 35 will be in an off condition. When transistor 35 is off, its collector and emitter terminals are essentially open circuited and the bias voltage present at the gate of SCR 30 is supplied through resistor 31. The voltage waveform present at terminals 14, 15 and 16 is approximately a square wave which varies between −0.7 volts below ground and +0.7 volts above the battery voltage present at terminal 20. Thus SCR 30 will be activated by the positive half of the square wave present at terminal 15, since this plus voltage will be coupled to the gate of SCR 30 through resistor 31. When SCR 30 fires, a large current passes through diode 33 and field coil 34. The current passing through field coil 34 causes voltages to be generated in generator coils 11, 12 and 13. This embodiment is specifically adaptable to automobile generators wherein either the field coil or the generator coils are rotated. During the negative portion of the square wave SCR 30 will shut off since its anode to cathode current will fall below the minimum holding current. When SCR 30 is shut off, field coil 34 will generate a voltage, due to the collapsing field current, to maintain current flow in coil 34 since current cannot change instantly in an inductor. Fly-wheel diode 32 limits the transient voltage spike caused by the collapsing field current in coil 34. Fly-wheel diodes are commonly used in the state of the art for this purpose.

When the battery is charged to a sufficient voltage, control transistor 35 will be driven into saturation as previously described. The voltage at the gate of SCR 30 will then be only a few tenths of a volt above the voltage at the emitter of transistor 35. The field coil winding 34 will maintain a current through the series connected device, diode 33, and thus the voltage applied across the gate to cathode terminals of SCR 30 will be a negative voltage. The negative gate to cathode SCR voltage will prevent SCR 30 from being turned on by subsequent positive going pulses and the gate to cathode voltage will remain negative for a substantial time due to the large amount of inductance represented by field coil winding 34. Thus the addition of diode 33 has produced a negative SCR gate to cathode voltage which will prevent the SCR from being turned on by further positive going pulses. Although only one diode is shown as diode 33, the principle can easily be extended to a series diode string replacing diode 33 and having the effect of applying a much larger negative gate to cathode bias to SCR 30. Also a series diode string can replace fly-wheel diode 32 if desired.

If diode 33 were not present in FIG. 1 and the cathode of SCR 30 were directly connected to field coil 34, the gate to cathode voltage of SCR 30 would be the saturation voltage of control transistor 35. This saturation voltage represents a small positive voltage and therefore could easily result in an undesired firing of SCR 30. Even if the saturation voltage of control transistor 35 were extremely small, the temperature characteristics of the SCR could result in an undesired firing occuring even at a gate to cathode voltage of the zero volts. Therefore, the disclosed SCR system can use control devices having noncritical saturation voltages and also provides a stable SCR control at high temperatures or with rapidly rising anode voltages.

Figure 2:
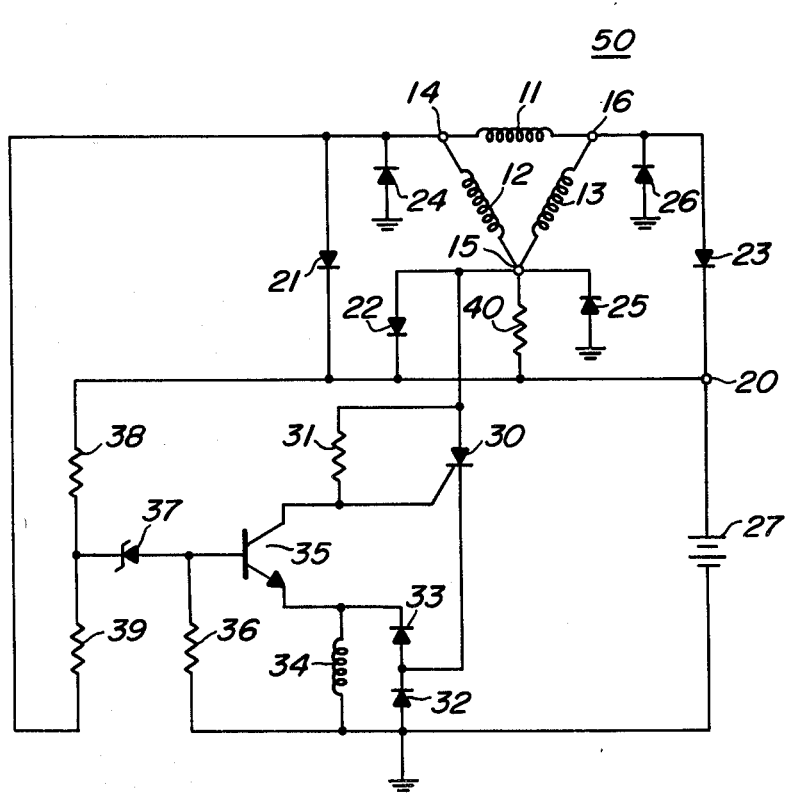
FIG. 2 is a circuit diagram of another alternator regulator system using the inventive SCR control system.

FIG. 2 shows an embodiment of an alternator regulator system 50 which agrees in every manner to system 10 described in FIG. 1 except that the cathode of zener diode 37 is now connected to terminal 14 through resistor 39 instead of being connected to ground through resistor 39. With this new connection the voltage divider network is now also sensitive to the voltage drop across the rectifying diodes. The advantage of this connection is fully described by the inventor in U.S. Pat. No. 3,716,774.

While numerous improvements on the concepts disclosed herein will be obvious to persons skilled in the art, all such improvements which retain the basic underlying concepts are within the scope of the inventon.

I claim:

1. A control system for an SCR regulator including; voltage supply means,
an SCR connected for regulating the SCR through current supplied by the voltage supply means and having a gate, an anode, and a cathode electrode,
a switching device having a control terminal, a first terminal and a second terminal, the first and second terminals having voltages applied therebetween and being substantially isolated from each other until a control signal exceeding a predetemined level is present at the control terminal whereupon the first and second terminals are substantially shorted together,
wherein the improvement comprises:
a series coupled device and inductor being energized by the SCR cathode through current flowing first through the device and subsequently through the inductor, the series device exhibiting a voltage drop due to the SCR through current,
the first and second terminals of the switching device being coupled to the gate of the SCR and the junction between the series device and inductor respectively, and
shunting means coupled across the series coupled device and inductor for shunting transient voltages created by the inductor, whereby during the period when the control signal is applied to the switching device the series device provides a negative bias between the gate and cathode of the SCR for keeping the SCR in a non-conductive state.

2. The system of claim 1 wherein said series device includes at least a first diode having its cathode coupled to the inductor and its anode coupled to the cathode of the SCR.

3. The system of claim 2 wherein said shunting means comprises at least a second diode having its cathode coupled to the cathode of the SCR.

4. The system of claim 3 wherein said shunting means consists only of a said second diode connected across the series connection of only a said first diode and said inductor, and the cathode of said second diode is connected to the cathode of said SCR.

5. The system of claim 3 wherein said switching device includes a transistor having its base electrode corresponding to said control terminal.

6. The system of claim 5 wherein said switching transistor has its collector and emitter electrodes correspond to said first and second control terminals respectively.

7. The system of claim 6 wherein said voltage supply means includes an AC potential source coupled to the anode of said SCR and supplying said SCR with through current.

8. The system of claim 7 wherein the gate of said SCR is connected to the anode of SCR through a resistor.

9. The system of claim 8 wherein said inductor is the field coil winding of a generator.

10. The system of claim 9 wherein the system includes apparatus for measuring the voltage of a battery and converting the voltage into said control signal.

11. An Alternator-Regulator system comprising:
generator means including an output winding having a first and a second terminal and a field coil winding having a first and a second terminal;
voltage supply means;
rectification means for coupling said output winding to said supply means for charging said supply means for the voltage generated in said output winding;
voltage sensing means for monitoring the supply voltage and generating a control signal; and
regulation means for energizing said field coil in response to said control signal including, a switching device having a control terminal for receiving said control signal and a first and a second terminal having voltages applied therebetween and being substantially isolated from each other until said control signal exceeds a predetermined level whereupon said first and second terminals are substantially shorted together, and SCR having its gate connected to said first switching termminal and coupled to a source of bias potential, a series device coupled in series with said field coil at said first field coil terminal and both being energized by the SCR cathode through current being coupled first through said series device and subsequently through said field coil, said series device exhibiting a voltage drop due to the SCR through current, said second switching terminal being coupled to the junction between said series device terminal and said field coil, shunting means coupled across the series coupled device and said field coil for shunting transient voltages created by said field coil, and a field coil exciting potential being applied between the anode of said SCR and said second field coil terminal.

12. The system of claim 11 wherein said series device comprises a first diode having its anode coupled to the cathode of said SCR and its cathode coupled to said first field coil terminal.

13. The system of claim 12 wherein said shunting means comprises a second diode having its anode coupled to said second field coil terminal and its cathode coupled to the cathode of said SCR.

14. The system of claim 13 wherein said switching device is a transistor having its base, collector and emitter terminals corresponding to said control and first and second switching terminals respectively.

15. The system of claim 14 wherein the gate of said SCR is coupled to a source of bias potential by being connected to the anode of said SCR through a resistor.

16. The system of claim 15 wherein the said field coil exciting potential is obtained by coupling the anode of said SCR to said first output winding terminal and coupling said second field coil terminal to said second output winding terminal.

17. The system of claim 16 wherein said voltage sensing means includes a series resistor divider network connected between said voltage supply means and ground, said network having an internal tap point connected to the cathode of a zener diode, the anode of said zener diode being connected directly to the base of said transistor and connected to ground through a resistor.

18. The system of claim 16 wherein said voltage sensing means includes a series resistor divider network connected between said voltage supply means and said second terminal of said output winding, said divider having an internal tap point connected to the cathode of a zener diode, the anode of said zener diode being connected directly to the base of said transistor and connected to ground through a resistor.

19. The system of claim 18 wherein said rectification means includes a pair of series diodes associated with each of said output winding terminals, said diode pair having the anode of one diode connected to the cathode of the other diode and to said associated output winding terminal, said diode pair having its external anode connected to ground and its external cathode connected to said battery means.

20. An Alternator-Regulator system comprising:
generator means including an output winding having a first and a second terminal and a field coil winding having a first and a second terminal;
voltage supply means;
rectification means for coupling said output winding to said supply means for charging said supply means from the voltage generated in said output winding;
voltage sensing means for monitoring the supply voltage and generating a control signal; and
regulation means for energizing said field coil in response to said control signal including, a switching device having a control terminal for receiving said control signal and a first and a second terminal having voltages applied therebetween and being substantially isolated from each other until said control signal exceeds a predetermined level whereupon said first and second terminals are substantially shorted, said second switching terminal being connected to said first field coil terminal, an SCR having its gate connected to said first switching terminal and coupled to a source of bias potential, a first diode having its anode connected to the cathode of a second diode and the cathode of said SCR, said first diode having its cathode coupled to said first field coil terminal, said second diode having its anode coupled to said second field coil terminal, and a field coil exciting potential coupled between the anode of said SCR and said second field coil terminal.

21. The system of claim 20 wherein said switching device is a transistor having its base, collector and emitter terminals corresponding to said control and first and second switching terminals respectively.

22. The system of claim 21 wherein the gate of said SCR is coupled to a source of bias potential by being connected to the anode of said SCR through a resistor.

23. The system of claim 22 wherein the said field coil exciting potential is obtained by coupling the anode of said SCR to said first output winding terminal and coupling said second field coil terminal to said second output winding terminal.

24. The system of claim 23 wherein said voltage sensing means includes a series resistor divider network connected between said voltage supply means and ground, said network having an internal tap point connected to the cathode of a zener diode, the anode of said zener diode being connected directly to the base of said transistor and connected to ground through a resistor.

25. The system of claim 23 wherein said voltage sensing means includes a series resistor divider network connected between said voltage supply means and said second terminal of said output winding, said divider having an internal tap point connected to the cathode of a zener diode, the anode of said zener diode being connected directly to the base of said transistor and connected to ground through a resistor.

26. The system of claim 25 wherein said rectification means includes a pair of series diodes associated with each of said output winding terminals, said diode pair having the anode of one diode connected to the cathode of the other diode and to said associated output winding terminal, said diode pair having its external anode connected to ground and its external cathode connected to said battery means.

* * * * *